(12) United States Patent
Foley

(10) Patent No.: US 11,144,992 B1
(45) Date of Patent: Oct. 12, 2021

(54) COMPUTER SYSTEMS FOR SELECTIVE TRANSMISSION

(71) Applicant: CFPH, LLC, New York, NY (US)

(72) Inventor: Kevin Foley, New York, NY (US)

(73) Assignee: CFPH, LLC, New York, NY (US)

(*) Notice: Subject to any disclaimer, the term of this patent is extended or adjusted under 35 U.S.C. 154(b) by 589 days.

(21) Appl. No.: 14/986,617

(22) Filed: Dec. 31, 2015

Related U.S. Application Data

(63) Continuation-in-part of application No. 13/844,779, filed on Mar. 15, 2013, now abandoned, which is a continuation-in-part of application No. 13/234,147, filed on Sep. 15, 2011, now abandoned.

(60) Provisional application No. 62/098,681, filed on Dec. 31, 2014, provisional application No. 61/513,667, filed on Jul. 31, 2011, provisional application No. 61/383,081, filed on Sep. 15, 2010.

(51) Int. Cl.
*G06Q 40/04* (2012.01)
*H04L 29/06* (2006.01)

(52) U.S. Cl.
CPC .............. *G06Q 40/04* (2013.01); *H04L 63/02* (2013.01)

(58) Field of Classification Search
CPC .............................. G06Q 40/04; G06Q 40/00
USPC ..................................... 705/37, 35
See application file for complete search history.

(56) References Cited

U.S. PATENT DOCUMENTS

| | | | |
|---|---|---|---|
| 7,076,461 B2 | 7/2006 | Balabon | |
| 7,565,313 B2 | 7/2009 | Waelbroeck | |
| 8,082,205 B2 | 12/2011 | Lutnick et al. | |
| 8,484,121 B2 | 7/2013 | Balabon | |
| 8,504,483 B2 | 8/2013 | Foley | |
| 8,712,903 B2 | 4/2014 | Lutnick et al. | |
| 8,751,362 B1 | 6/2014 | Lutnick et al. | |
| 8,751,372 B1* | 6/2014 | Friedman | G06Q 40/04 705/37 |
| 8,768,819 B2 | 7/2014 | Lutnick et al. | |
| 2002/0120555 A1* | 8/2002 | Lerner | G06Q 30/0283 705/37 |
| 2006/0026090 A1 | 2/2006 | Balabon | |
| 2006/0080214 A1* | 4/2006 | Hausman | G06Q 40/00 705/37 |
| 2007/0294162 A1* | 12/2007 | Borkovec | G06Q 40/00 705/37 |
| 2008/0306864 A1* | 12/2008 | Foley | G06Q 20/383 705/37 |

(Continued)

OTHER PUBLICATIONS

U.S. Appl. No. 12/477,523, filed Jun. 2009, Lutnick, et al.
U.S. Appl. No. 13/234.147, filed Sep. 2011, Lawrence Tinit.

*Primary Examiner* — Kirsten S Apple

(57) ABSTRACT

Various embodiments are directed to a trading system and method for indicating trading interests. A wrapped liquidity notice may be provided to a user, in which the wrapped liquidity notice provides first information about a trading interest of at least one other user. The user may request to unwrap the liquidity notice. Responsive to the request, the liquidity notice may be at least partially unwrapped to provide to the user second information about the trading interest. The liquidity notice may be unwrapped additional times to reveal additional information about the trading interest. Exemplary information that may be unwrapped for the user comprises information about the buy/sell side, trading product, price, and quantity of the trading interest.

22 Claims, 12 Drawing Sheets

(56) References Cited

U.S. PATENT DOCUMENTS

| | | | |
|---|---|---|---|
| 2009/0307121 A1 | 12/2009 | Lutnick et al. | |
| 2010/0241588 A1* | 9/2010 | Busby | G06Q 40/00 |
| | | | 705/36 R |
| 2012/0284747 A1* | 11/2012 | Joao | G06Q 30/02 |
| | | | 725/34 |
| 2014/0099921 A1* | 4/2014 | Weiss | H04W 12/08 |
| | | | 455/411 |
| 2014/0122297 A1* | 5/2014 | Dunlap | H04W 4/14 |
| | | | 705/26.61 |
| 2014/0229353 A1 | 8/2014 | Lutnick et al. | |
| 2015/0026029 A1 | 1/2015 | Lutnick et al. | |
| 2015/0134351 A1* | 5/2015 | Mari | G16H 10/60 |
| | | | 705/2 |

* cited by examiner

FIG. 12

Liquidity Notice re: | Click here to dismiss | Click here to trade

Timer: 15

1. INTEREST IN TRADING TECH SECURITY
2. INTEREST IN TRADING STOCK: "GOOG"
3. INTEREST IN SELLING STOCK: "GOOG"
4. Price is below midpoint of NBBO
5. Quantity is at least 50,000 shares
6. Price is $1.27 below NBBO midpoint
7. Quantity is 132,500 shares
8. Contra party is a Broker

COMPUTER SYSTEMS FOR SELECTIVE TRANSMISSION

CROSS-REFERENCE TO RELATED APPLICATIONS

The present application: claims the benefit of U.S. Provisional Application Ser. No. 62/098,681, filed Dec. 31, 2015, entitled "Liquidity Notices with Selectable Detail"; and is a continuation-in-part of U.S. application Ser. No. 13/844,779, filed Mar. 15, 2013, which is a continuation-in-part of U.S. application Ser. No. 13/234,147, filed Sep. 15, 2011, entitled "SYSTEMS AND METHODS FOR ORDER PRICING," which claims the benefit of U.S. Provisional Patent Application Ser. No. 61/513,667, filed Jul. 31, 2011, entitled "SYSTEMS AND METHODS FOR PRICING ORDERS" and U.S. Provisional Patent Application Ser. No. 61/383,081, filed Sep. 15, 2010, entitled "SYSTEMS AND METHODS FOR ORDER PRICING." The disclosures of each of the above-listed applications are incorporated herein by reference in their entireties.

BACKGROUND

In many conventional electronic trading systems, trading parties submit trading orders for a security at prices and quantities they are willing to trade. The prices and quantities they are willing to trade for a particular security may depend on various factors.

Various systems enable users to submit trading orders or requests for trading orders that are shown to a plurality of counter-parties. The orders may have different prices and quantities, and may be submitted so that a counter-party does not know the identity of the trader submitting the order or request. For example, U.S. patent application Ser. No. 10/310,345 (U.S. Patent Publication No. 2004/0034591) describes a system that sends anonymous trading messages from one party to a targeted group of counter-parties.

BRIEF SUMMARY

Various embodiments are directed to a trading system and method for selectively indicating trading interests to users. A "wrapped" liquidity notice may be provided to a user, in which the wrapped liquidity notice provides limited first information about a trading interest of at least one other user. The user may request to unwrap the liquidity notice to obtain further information about the underlying liquidity. Responsive to the request, the liquidity notice may be at least partially unwrapped to provide to the user additional second information about the trading interest. The liquidity notice may be unwrapped additional times to reveal additional information about the trading interest. An alert may be provided to the at least one other user indicating information about the unwrapping, such as the time at which a liquidity notice was unwrapped. Exemplary information that may be provided in a liquidity notice and/or unwrapped for the user may comprise information about the buy/sell side, trading product, price, and quantity of the trading interest.

BRIEF DESCRIPTION OF THE FIGURES

FIGS. 3-12 depict exemplary user interfaces according to various embodiments of the systems disclosed herein.

DETAILED DESCRIPTION OF EXEMPLARY EMBODIMENTS

Figure 1:
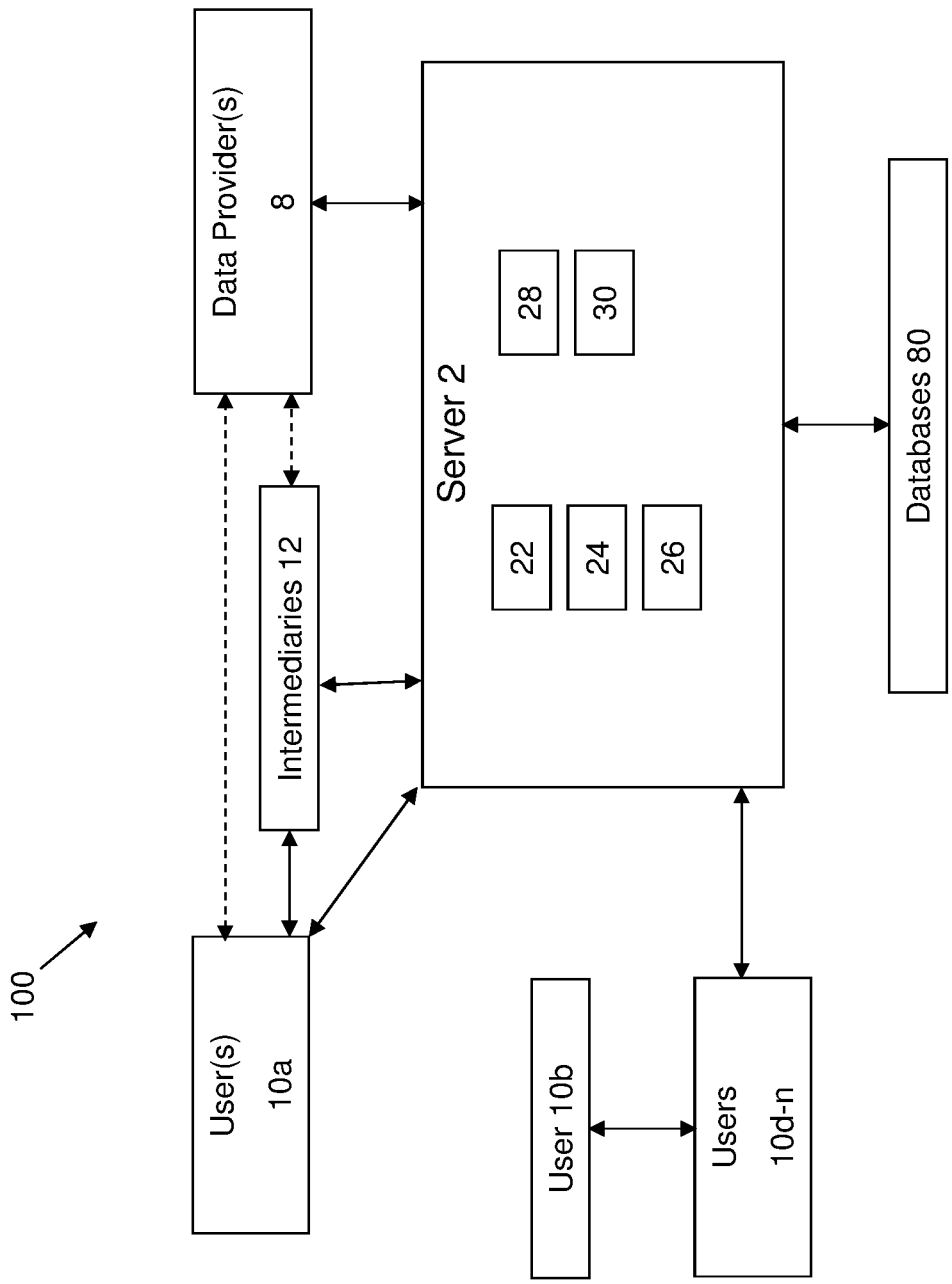
FIG. 1 depicts an exemplary system according to at least one embodiment of the systems disclosed herein.

In some embodiments, participants (e.g., participants in a trading system described in U.S. patent application Ser. No. 10/310,345) would receive liquidity notices, e.g., as described in U.S. patent application Ser. No. 10/310,345 (or as they do in the "AQUA" system provided by Aqua Securities, L.P.). For example, a pop-up window or message may appear in a trading interface of the user providing information about the liquidity notice. In some embodiments, a user may interact with the liquidity notice, e.g., by clicking a button in the notice (e.g., a button located inside a window associated with the pop-up notice). In some embodiments, the liquidity notice may have associated functionality enabling the user to trade against the liquidity associated with the liquidity notice.

In some embodiments, a liquidity notice displayed to a particular participant may display a limited amount of information about the associated liquidity. For example, a liquidity notice may reveal one or more of the following items of information: (1) the existence of interest for one or more specific trading products, e.g., trading product(s) identified to be of possible interest to the particular participant (e.g., a trading product identified in the particular participant's OMS); (2) existence of interest on a specific side (e.g., the buy side, sell side, or both) for a specific trading product (e.g., a trading product(s) identified to be of possible interest to the particular participant); (3) information about the quantity of the interest (e.g., that the interest is above a minimum or below a maximum quantity threshold such as 1000 shares or units); (4) information about the price of the interest (e.g., that the price is within a certain range of the NBBO, or within a certain range of a threshold price such as a price of a corresponding contra order in the particular participant's OMS); and (5) information indicating whether the interest is broker or natural. For example, in some embodiments, the limited information may comprise information that interest exists for a specific trading product of possible interest to the particular participant, such as the existence of interest in trading IBM stock when the particular participant has a pending order to buy (or sell) IBM stock.

In some embodiments, the limited information may not identify the side of the interest (e.g., buy or sell) and may not provide any information about the quantity of the interest.

In some embodiments, a liquidity notice may be unwrapped several times to reveal different types of information about the liquidity notice.

In some embodiments, a liquidity notice may comprise a prompt to dismiss the liquidity notice, e.g., by selecting a "dismiss" icon at a user interface. Dismissing the liquidity notice may cause it to disappear (e.g., from a user interface) and/or otherwise cease to be available to the user receiving the liquidity notice.

In some embodiments, any actions by any user or interface concerning a liquidity notice may be monitored and/or recorded, including, e.g., the following: the time at which a liquidity notice is generated or received (e.g., by a first party receiving the notice); the time at which an alert (e.g., to a second party responsible for the liquidity at issue in the liquidity notice) is transmitted to or received by a second party; the time at which a request to unwrap a notice is generated or received; the content of any liquidity notice, unwrapping, or alert; any trades or attempts to trade based on the liquidity notice; the time at which such trade (or attempt) occurs; and other information.

In some embodiments, users may choose to obtain more information about the liquidity notice. In some embodiments, participants may click to "unwrap" the notice to reveal further information about the liquidity notice. For example, users may choose to obtain more information about the side of the interest, the price of the interest, and the quantity of the interest. For example, the user may select an indicia or click a button that causes more information to be revealed. For example, a user may click a one or more buttons to obtain one or more pieces of information about the side of the interest (buy or sell), one or more other buttons to obtain one or more pieces of information about the price, and one or more other buttons to obtain one or more pieces of information about the quantity. In some embodiments, clicking a single button can cause one or more pieces of information about the side, price, and/or quantity to be revealed to the user. For example, clicking a single button or selecting a single indicia in the notice may trigger the revealing of the buy/sell side and information about the price (e.g., the price or price range of an order, e.g., if the interest is an order).

For example, clicking the button or selecting the relevant indicia can trigger the system to output the requested information to the user.

In some embodiments, a "wrapped" notice may indicate one or more or all of the following: (1) indicia indicating the specific trading product, e.g., the ticker symbol; (2) the side of the interest (bid or offer); and (3) broker or natural. In some embodiments, the wrapped notice may indicate a time limit for acting on the notice (e.g., a time limit for "unwrapping" the notice to see more information), e.g., a timer (such as a ticking timer, "shot clock", or other timing indicia or mechanism). In some embodiments, the timer may count up (e.g., to a maximum specified or unspecified time limit), count down to zero (e.g., like a shot clock), or simply track the amount of time the unwrapped notice has been outstanding. In some embodiments, the unwrapped notice may have an associated button on a user interface selectable to unwrap (placed in the same spot on the ticket as the "take offer/hit bid" button)—and a button to dismiss (placed in the same spot it currently occupies.) In some embodiments, a liquidity notice for a user may expire after the applicable time period. When the liquidity notice expires for a particular notice, one or more of the following may occur: (1) the liquidity notice disappears; (2) the liquidity notice is rendered ineffective; (3) the liquidity notice freezes such that already-revealed information about the liquidity notice is still revealed to the user, but no further information may be obtained concerning the notice; (4) the liquidity notice is cancelled.

In some embodiments, the time at which liquidity notices are unwrapped may be provided, e.g., to a party whose liquidity triggered the notice to a potential counterparty. This information may be provided in substantially real time or periodically, e.g., in a report to the order contributor concerning a plurality of liquidity notices, e.g., across a plurality of different trading products.

In some embodiments, order flow contributors may choose whether their liquidity comes "wrapped" or not. For example, one user may elect that its orders satisfying specific criteria (e.g., all orders in the tech sector (e.g., for tech stocks, bonds, and futures), or all orders for a specific trading product, or all orders during a specific time period, or each order meeting criteria such as a threshold size or dollar volume) should be "wrapped" when disclosed to other parties.

In some embodiments, a timer associated with an unwrapped notice may not start counting toward a time expiration until receipt or viewing of the unwrapped notice has been confirmed by the user. For example, a user may receive an indicia indicating an unwrapped notice, wherein the indicia does not reveal any information about the unwrapped notice, not even the relevant trading product. The user may confirm receipt of the unwrapped notice by clicking on the indicia, when then causes the unwrapped notice to be revealed to the user. For example, clicking on the unwrapped notice may reveal the trading product of interest, the side of the interest (buy/sell), and broker or natural.

In some embodiments, various options may appear when a user clicks to "dismiss" a wrapped or unwrapped liquidity notice. Those options may be similar or identical to those options currently offered in the AQUA system.

In some embodiments, when a participant selects to "unwrap" a wrapped liquidity notice, further information about the liquidity notice may be presented to the user, such as quantity, price, and/or other information. In some embodiments, the participant may still have an option to "dismiss" a liquidity notice after clicking "unwrap." As used herein, requesting to "unwrap" a liquidity notice means requesting further information about the liquidity at issue in the notice. In some embodiments, a liquidity notice may be "unwrapped" several times to reveal more and more information about the liquidity at issue in the notice, such as trading product identity, buy/sell side, price, quantity, and counterparty information (such as broker or natural).

In some embodiments, a central server (or local module for a decentralized dark pool matching system) may record and track the timing and occurrence of all actions relevant to a liquidity notice, such as the time at which the interest is entered, the time at which an unwrapped notice is provided to a user, the time at which a user confirms receipt of indicia of an unwrapped notice, the time at which a user clicks on the indicia to reveal the unwrapped notice, the time at which a user clicks to unwrap a notice (and/or the time at which a user dismisses an wrapped notice), the time at which a user dismisses an unwrapped notice, the time at which a user requests to trade based on the liquidity notice.

In some embodiments, one or more items of tracked information may be provided to order flow contributors, such as the source of the interest associated with the liquidity notice, e.g., on a delayed basis. For example, if a liquidity notice is transmitted to Trader A based on Trader B's interest in selling IBM stock, and Trader A subsequently unwraps and then dismisses the liquidity notice, then the system may notify Trader B that Trader A received, unwrapped, and then dismissed the notice. However, the system may notify Trader B of one, more, or all of these events a certain amount of time after they occur, e.g., one second, five seconds, twenty seconds, one minute, ten minutes, one hour, four hours, one trading day, one trading week, or another amount of time after the relevant event occurs. It should be appreciated that different time delays may apply to different events, different users, different interest types, different trading products, etc. In some embodiments, notification may be instantaneous (e.g., wherein the delay=zero).

In some embodiments, the system may provide various types of data back to the trader who is the original source of the interest (e.g., Trader B in the example above). For example, the system may periodically (e.g., every minute, hour, trading day, week, etc.), instantaneously, or with delay provide to such trader information about, e.g., (1) when a trader looked at a liquidity notice related to that source, (2) how many people looked at liquidity notices related to that source (e.g., for a given trading product or for all trading products), (3) when and/or how many traders chose to trade based on the notice, (4) when and/or how many traders chose not to trade based on the notice, and any other of the information described herein. In this way, a source of order flow (e.g., a source of interest for which liquidity notices are provided) may receive some information about the extent to which other traders are receiving or viewing information about the source's order book.

In some embodiments, participants in a dark pool matching system such as AQUA may choose whether the liquidity notices transmitted to other users based on their own interest are wrapped or not, and how much information is revealed in in the "unwrapped" notice as well as in the unwrapped notices (or multiple stages of unwrappings, if applicable). For example, a user may select that liquidity notices sent to other traders based on its own interest shall initially always be unwrapped notices that display only ticker symbol, and that may be subsequently unwrapped (e.g., within a configurable period of time such as thirty seconds) to display the side and broker or natural.

In some embodiments, a user may select these preferences for liquidity notices related to one type of trading product (e.g., equities), and choose that all notices based on another type of trading product (e.g., futures) are always unwrapped, and further that another type of asset class (e.g., bonds) shall unwrap in two stages. All such preferences may be configured by the user, e.g., via a user interface.

In some embodiments, the system may cause all liquidity notices to be wrapped.

In some embodiments, a liquidity notice may have an expiration time. In some embodiments, there may be a time limit (e.g., displayed with the notice) within which to request to unwrap the notice.

In some embodiments, a user receiving a liquidity notice may further receive information about the type of additional information that will be provided by unwrapping the liquidity notice. For example, the liquidity notice itself (or some other communication) may specify that upon request (or upon "unwrap"), one or more of the following types of information may be provided: type of counterparty (e.g., institutional trader, broker, fund, individual), price range of existing contra order, specific price of existing contra order, size range of existing contra order, specific size of existing contra order, contra pricing algorithm (e.g., contra party's algorithm for determining order price), contra quantity algorithm (e.g., contra party's algorithm for determining order size), or other information, e.g., about an existing contra order.

In some embodiments, a user receiving a liquidity notice may receive only limited information about the type of information that will be revealed by unwrapping the liquidity notice. For example, the liquidity notice (or information accompanying a liquidity notice, or received after the liquidity notice) may indicate that unwrapping the liquidity notice will reveal information about price (e.g., and/or quantity, contra party identity, etc.).

In some embodiments, a user receiving a liquidity notice may not be provided with information that helps to identify the type of information that would be provided by unwrapping the notice. For example, the liquidity notice may indicate that unwrapping the notice will cause additional information to be provided, but not indicate whether such information will be about price, quantity, counterparty, etc.

In some embodiments, a user requesting to "unwrap" a liquidity notice (e.g., requesting additional information about liquidity) may not know in advance the type of information that will be provided in response to the request. For example, a user requesting to unwrap a liquidity notice may not know in advance if the additional information to be provided will be about price or quantity, or some other parameter.

In some embodiments, the user may know limited information about the type of information that will be revealed by unwrapping a liquidity notice. For example, at the time of requesting the information (e.g., at the time of requesting to unwrap the liquidity notice), the user may know that the additional information relates to a price, such as the price of an existing contra order, but the user may not know whether the additional information will specify a particular price, a price range, or other descriptive information about the price (e.g., "the price is below the NBBO").

In some embodiments, at the time of requesting to unwrap the liquidity notice, the user may know the type of information that will be provided. For example, the user may know that the information will be a specific price, a price range, a specific quantity, a quantity range, or other information.

In some embodiments, various features described herein may be implemented by a decentralized system wherein each user computer performs a matching function to trigger a liquidity notice. For example, as described in various patent applications referenced herein, a decentralized matching system, such as that offered by Aqua Securities L.P., may enable each user workstation to analyze trading information about the user (e.g., such as information about orders or the user's Order Management System ("OMS")) as well as information about orders from other users without revealing information about the other orders to the user. For example, a firewall on each user's workstation may prevent information about other users' orders from being disclosed to the user. In this way, user workstations may process and analyze orders from other users confidentially, such that information about one user's order is transmitted to a plurality of other users' workstations without being revealed to those users, and the existence of the one user's order is not revealed to the other users. When a user workstation identifies a possible match based on the user's trading information (such as that stored in the user's OMS) and an order (or other trade information) received from one of the other users, the user workstation may cause a liquidity notice to be output to the user.

Accordingly, in some embodiments, a liquidity notice may be triggered by a workstation of the user to whom the liquidity notice is communicated. For example, a computer of a first user may determine, based on information in the first user's OMS and based on trading interest information received from a second user, that the first user is qualified to receive information about the second user's trading interest. In some embodiments, the trading interest from the second user may comprise information about an order from the second user, such as price information, quantity information, the side of the trade (buy or sell), information about the trading product (e.g., CUSIP number, stock name, information about the industry sector, information about the type of security (e.g., stock, bond, future, option, etc.), information about the second user who submitted the order, and/or other information. In some embodiments, the trading interest may comprise the complete details of the order.

In some embodiments, the liquidity notice itself may be triggered by and transmitted from the user's computer to the user. After the liquidity notice is provided to the first user, additional information about the trading interest (e.g., subsequent "unwrappings") may also be provided by the user's computer. Accordingly, after initially receiving information about the trading interest, the first user's computer may not need any further information from other computers in order to provide subsequent information to the user about the trading interest.

In some embodiments, various features described herein may be provided by a centralized trading system, e.g., such as the centralized darkpool matching system previously offered by Liquidnet. For example, a central processor may receive and match orders from a plurality of traders. Each user's order(s) may remain secret from the other traders because the centralized processor that receives orders does not disclose those orders to other traders. Where there is a match or possible match between two orders or two traders, the central processor may notify one or both counterparties. Accordingly, in some embodiments utilizing a central matching facility, the liquidity notices may be originated and transmitted to a user from the central processor. Subsequent information that is "unwrapped" may also be originated and transmitted from the central processor, which may maintain information about the counterparty interest.

In some embodiments, the liquidity notice and subsequent "unwrapped information" may be originated and/or transmitted from the same or different computer components. For example, a liquidity notice may initially be generated and transmitted by the matching processor (e.g., either a central matching processor or a local matching processor at a user workstation), and subsequent "unwrappings" may be transmitted from a central processor or user computer. In some embodiments, subsequent "unwrappings" may be transmitted from the contra party's computer. For example, a first user's computer may provide a liquidity notice to the first user concerning a second party's order. A request to unwrap the notice may be sent to the second user's computer, which may then provide further information about the liquidity notice.

In some embodiments, only one of the counterparties may be provided a liquidity notice. In some embodiments, both counterparties may be provided with a liquidity notice. For example, if a first trader and a second trader having potentially matching interest, liquidity notices may be sent to both traders.

In some embodiments, a request to "unwrap" (e.g., obtain further information about) a liquidity notice may trigger a communication to the counterparty, e.g., concerning the existence of a party who received a liquidity notice. For example, a first trader may receive a liquidity notice related to a second trader's order. The liquidity notice may indicate an interest to trade a particular bond, but may not indicate price, volume, or side (buy or sell). The first trader may request to "unwrap" the notice to obtain more information. Receiving the request to unwrap the liquidity notice may trigger an alert to be sent to the second trader that another trader (the first trader) has received a liquidity notice concerning the second trader. The alert may indicate the existence of the liquidity notice, a relevant order (or other information) concerning the second trader that caused the liquidity notice to be generated (e.g., a relevant order of the second trader), and/or one or more pieces of information previously identified herein concerning liquidity information from the first trader (e.g., a relevant order of the first trader that triggered the liquidity notice, price information, size information, a side, information about the first trader, and/or other information).

In some embodiments, "unwrapped" information may be transmitted at the election and/or selection of the contra party. For example, if a first user who receives a liquidity notice (concerning a second user's order) requests to unwrap the notice, the request may be routed to the second user's terminal. The second user may have the option to approve or reject the request, in which case additional information will or will not be transmitted to the first user. In some embodiments, the second user may have the option to specify the information or type of information that is provided in the "unwrapped" information. For example, the second user may select to provide price (or quantity or side or other) information (e.g., the specific price or price range, or the specific quantity or quantity range) about the second user's interest. In some embodiments, the second user may instead elect to cancel the liquidity notice or cancel its corresponding order entirely, e.g., in which cases the first user may no longer have the option to pursue the liquidity notice further. The process may repeat itself as the liquidity notice is further unwrapped.

In some embodiments, the computer system (e.g., either the server 2 or a computer of a specific user 10) may qualify the specific user to see information about a trading interest. A user may be qualified to view an order according to any of the systems and methods described in U.S. Ser. No. 13/888,352, filed May 6, 2013, entitled "SYSTEMS AND METHODS FOR DETECTING INTEREST AND VOLUME MATCHING" with respect to qualifying a user(s) to see an order. For example, a user may be qualified to view a trading interest based on the user's OMS (e.g., one or more orders stored in the user's OMS), the user's past trading history (e.g., a history of trading the relevant product or a related product such as a stock in the same industry sector), a preference of the user, and other criteria.

Various embodiments are directed to a trading system and method for determining orders and their prices. A trader may request a quote for a composite order comprising a plurality of constituent orders. The request may be provided to a pricing module that is located behind the trader's firewall. The pricing module may determine a quote to fill the composite order on behalf of a pricing entity associated with a fund. The quotes may be determined based on current market conditions and net tracking error that would result if the fund executed all of the constituent orders of the composite trading order. The pricing module may provide the requesting trader with the requested quote, which may comprise a firm counter-order immediately executable against the composite trading order. The trader may execute the quote, and the pricing entity may fill all the constituent trading orders of the trader's composite trading order at the quoted price(s).

In some embodiments, the quote and the existence of the request may not be transmitted outside the trader's firewall until the trader requests to execute the quote. The pricing module may be encrypted such that information about the pricing module's pricing algorithms and information about the fund is not revealed to the trader. In this way, information about the fund and the pricing entity's pricing algorithms may be kept secret from each trader, and information about the trader's quotes and quote requests may be kept confidential from the pricing entity even though the quotes are binding on the pricing entity.

Various other embodiments are directed to a trading system and method for determining orders and their prices.

A memory stores instructions which, when executed, direct the at least one processor to perform various actions, such as the following. The processor may determine a price deviation from a neutral price for one or more first orders. The first order may include an order to buy and/or sell one or more quantities of one or more securities. The price deviation may be based on a risk associated with accepting the one or more first orders. The processor may determine a plurality of second orders. Each of the plurality of second orders includes a respective order to at least one of buy and sell a respective second security. The processor may determine a reduction to the price deviation based on a combined risk associated with execution of the first order and at least one second order. The processor may accept all or a portion of the at least one first order and submit all or a portion of the at least one second order.

FIG. 1. Exemplary System

Some embodiments of the present invention provide systems and methods for selectively disclosing liquidity information. System may comprise one or more computers (e.g., in communication over a network) and other computing elements coupled to databases and programmed with software that instructs the computing elements to perform the functions described herein.

FIG. 1 depicts a system according to at least one embodiment of the systems disclosed herein.

The system 100 may comprise one or more servers 2 coupled to one or more databases 80, one or more data providers 8a-8n, one or more end users 10a-10n, and one or more agents 12. The data providers 8a-8n, users 10, agents 12, and server 2 may each communicate with each other. Users 10 may also communicate with other users 10.

System 100 and server 2 may perform the functions described herein for a fund, CCA, AQUA ATS, and Quantal.

Server 2 may comprise one or more processors, computers, computer systems, computer networks, and or computer databases. Server 2 may comprise modules 18-64. Server 2 may also comprise one or more databases, such as databases 80. Server 2 may communicate with users 10, data providers 8, and agents 12. For instance, server 2 may communicate with a user 10 computer, such as a browser of a user computer, e.g., over the internet.

Databases 80 may comprise one or more processors, computers, computer systems, computer networks, and/or computer databases configured to store information. Each of databases 80 may communicate with server 2, e.g., via one or more modules of server 2. For instance, server 2 and modules may store information in databases 80 and may also use information stored in databases 80.

Users 10a-10n may comprise one or more human persons, computers, terminals, users, traders, trading entities, or other entities. Users 10 may interact with agents 12, server 2, and/or other users 10. As used in this application, users 10a-10n may also refer to a user's interface to other system 100 components (like server 2), such as a user's PDA or computer or a program running on a user's computer such as a computer web browser like Internet Explorer™, which may communicate with data providers 8, agents 12, and/or server 2.

Data provider(s) 8 may comprise any person, processor, information service, or other entity that publishes or otherwise provides information relating to one or more financial instruments, markets, trading platforms, traders, orders, or other financial- or trade-related information. In some embodiments, the data may include information that may be of interest to or used by a user 10 or server 2.

Data provider 8 may provide information in real time, as information is created or as it first becomes available to the general public, or at another time. Data provider 8 may provide such information in any one or more of a variety of forms and means such as video, audio (e.g., radio broadcast), text (e.g., stock ticker-type information), or other data that may convey information. Data may be provided at a variety of different timings. In some embodiments, data may be provided in periodically, continuously, or continually, e.g., via a data feed (e.g., a stream of data that includes real time updates of trading-related information). In some embodiments, data may be provided after an event, e.g., a trade or submission of an order.

In some embodiments, data provider 8 may provide to server 2 (and/or agents 12 and/or users 10) trading-related information.

Intermediaries 12 may comprise one or more trading-related entities such as a broker, fund manager, or other entity that interacts with users, data providers, and server, but is separate from those entities.

The server 2 may comprise a computer, server, hub, central processor, or other entity in a network, or other processor. The server 2 may comprise input and output devices for communicating with other various system 100 elements. In some embodiments, the server 2 may comprise a trading platform, an exchange, a fund or fund management system, an order matching system, or other processing system.

In some embodiments, the server 2 may be comprised in an end user's computer 10, e.g., as a toolbar in a user's web browser or another program running on the user's computer.

As shown in FIG. 1, the server 2 may comprise a plurality of modules, such as modules 22-30. Each module may comprise a processor as well as input and output devices for communicating with other modules, databases, and other system elements.

User interface module 22 may communicate with users. User interface module 22 may cause liquidity information to be selectively disclosed to a particular user. For example, user interface module may provide a user information about liquidity (e.g., indicating the existence of trading interest that may be of interest to the user). The user interface module 22 may enable the user to request further information about the liquidity, such as information about size and/or price of the interest. The user interface module may selectively disclose further information about the liquidity, such as information about the size and price.

User interface module 22 may cause information to be output to a user, e.g., at a user output device such as a display device (e.g., a display device at a user terminal), a speaker. The information outputted to a user may be related to a user account, preferences, and other information described herein. User interface module may communicate the information electronically, e.g., via networked communication such as the internet (e.g., in an email or webpage), telecommunication service, etc. In some embodiments, user interface module 22 may comprise input devices for users to communicate trading-related information.

User interface module 22 may receive instructions to trade or attempt to trade with respect to a liquidity notice. For example, user interface module may prompt a user to trade against an order described or partially described in a liquidity notice and/or its "unwrappings." For example, user interface module 22 may provide a selectable "hit bid" or "lift offer" button with a liquidity notice, that when selected may cause the user to hit a bid (if the liquidity notice concerns a bid) or lift an offer (if the liquidity notice concerns an offer) associated with the liquidity notice.

User interface module 22 may provide one or more timers associated with the liquidity notice. For example, a timer may count down the time remaining to execute against the liquidity notice. For example, a timer (e.g., a different timer) may count down the time remaining to unwrap the notice.

User interface module 22 may cause a user interface to be provided to the user, such as the unse interface depicted in FIGS. 3-12.

User preferences module 24 may receive, identify, or determine user preferences concerning one or more trading products. For instance, the module may receive the preferences from a user interacting with a user interface. The module may also receive them from an automated user terminal. The module may also determine them based on a program that automatically determines user preferences concerning one or more portfolios or securities.

Financial information module 26 may determine financial information associated with one or more orders, trades, financial instruments, portfolios, funds, financial metrics, and other financial information.

Search module 28 may search for and/or identify and/or solicit one or more securities, orders, and/or counter-parties, e.g., concerning one or more orders. For instance, search module may search one or more financial databases (e.g., a database that stores orders or counter-party preference information), e.g., via the internet, to determine one or more securities or orders that satisfy one or more parameters, such as parameters based on preferences from a user.

Price module 30 may determine and associate one or more values or prices with one or more orders, securities, portfolios, or other financial entities, e.g., as described herein. For instance, price module 30 may determine a price, e.g., for an order, or to be paid to or received by a user or server, e.g., for one or more securities. For instance, price module may determine a price or value (such as a net present value) that an entity such as a fund is willing to pay for or sell a particular portfolio (e.g., a quantity of a security offered for purchase or sale, e.g., in a trading order). Prices may include a current price, a historical price (e.g., a price such as a market price at a prior time, such as a week earlier), and an estimated future price (e.g., based on changing price information, such as a recent increase or decrease in a price over a recent period of time).

Databases

As shown in FIG. 1, a database 80 may be coupled to the server 2. The database 80 may comprise a plurality of databases as described below. Databases 80 may store information about users, elements, and other information.

The modules may function separately or in various combinations. While the modules are shown within a single server, the modules may also operate among several servers. The modules may communicate with a plurality of databases, which may also function collectively or separately.

The modules of server 2 may store, access and otherwise interact with various sources of data, including external data, databases and other inputs.

Figure 2:
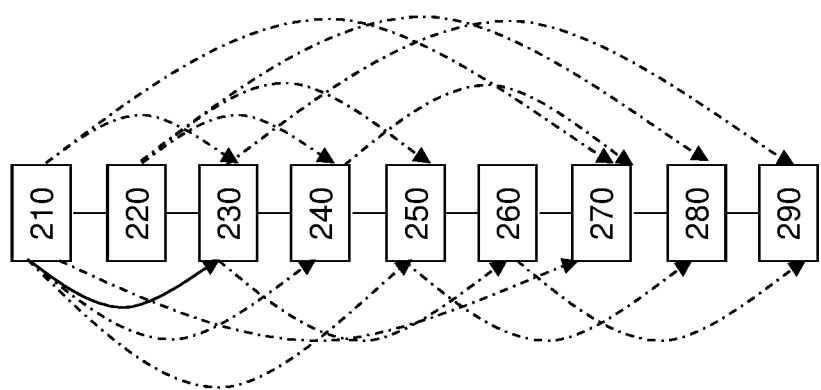
FIG. 2 depicts an exemplary flow chart according to at least one embodiment of the systems disclosed herein.

FIG. 2. Exemplary Flow Chart

FIG. 2 depicts an exemplary flow chart according to at least one embodiment of the systems disclosed herein.

In block 210, a user may input orders into an OMS. Those orders may be processed by the user's computer.

In block 220, a trader may specify a preference that liquidity notices about a specific order or order type (e.g., to buy Google stock) be "wrapped," such that only limited information is provided in a liquidity notice about the order.

The trader may further request that the trader be notified, e.g., at the time (or after) a liquidity notice concerning the order is provided to another party.

In block 230, the user's computer may receive a specific order from the trader for which the trader expressed a preference for "wrapping". The specific order may not be disclosed to the user at this time.

In block 240, the user's computer may determine that the user is qualified to receive information about the specific order, such as a wrapped liquidity notice.

In block 250, the user's computer may provide the wrapped liquidity notice to the user. The wrapped liquidity notice may provide limited information about the specific order, such as an identification of a specific trading product (e.g., Google stock) and a buy/sell side (e.g., that the liquidity is an order to sell Google stock). The liquidity notice may comprise an option to dismiss the notice and an option to (at least partially) "unwrap" the notice and provide additional information about the liquidity.

The time at which the liquidity notice is provided may be stored and later provided to the trader. In some embodiments, an alert may be sent (e.g., immediately) to the trader, e.g., indicating that a liquidity notice concerning the specific order was provided to another party.

In block 260, the user may request to "unwrap" the notice to obtain additional information about the notice. The time at which this request is received may be stored and later provided to the trader.

In some embodiments, an alert may be sent (e.g., immediately) to the trader, e.g., indicating that a liquidity notice concerning the specific order was provided to another party, or that additional information was requested.

In block 270, additional information about the liquidity may be provided to the user. For example, the additional information may comprise information about the price, quantity, and/or contra party. (In other embodiments, some or all of this information may be provided in the original liquidity notice, or in later unwrappings.) In some embodiments, the actual information provided to the user may also be provided to the trader.

In block 280, the user may request further information about the liquidity notice, e.g., for one or more subsequent "unwrappings." Additional information may be provided in the one or more subsequent "unwrappings."

In block 290, the user may request to execute against the specific order described in the liquidity notice. For example, the user may request to lift the offer to sell Google stock.

It should be appreciated that the actions described in the blocks for the methods described herein are exemplary only, and need not be performed in the order presented here. Further, it is not necessary to accomplish all of the actions described in the blocks. Rather, any number of the blocks (e.g., four of the blocks or six of the blocks) may be accomplished, and in any order. Further, the actions described herein may be combined with any other actions described herein, in any order.

FIGS. 3-12. Exemplary User Interfaces

FIGS. 3-12 depict exemplary user interfaces displaying exemplary liquidity notices and exemplary successive "unwrappings." These interfaces may be provided, e.g., at a computer display, a touchscreen, a handheld device, or other output device. Each user interface may comprise selectable indicia that may be selected by a user (e.g., by clicking or touching it), e.g., to trigger more information or additional actions. In an exemplary embodiments, FIGS. 3-12 depict successive openings of the same liquidity notice.

Figure 3:
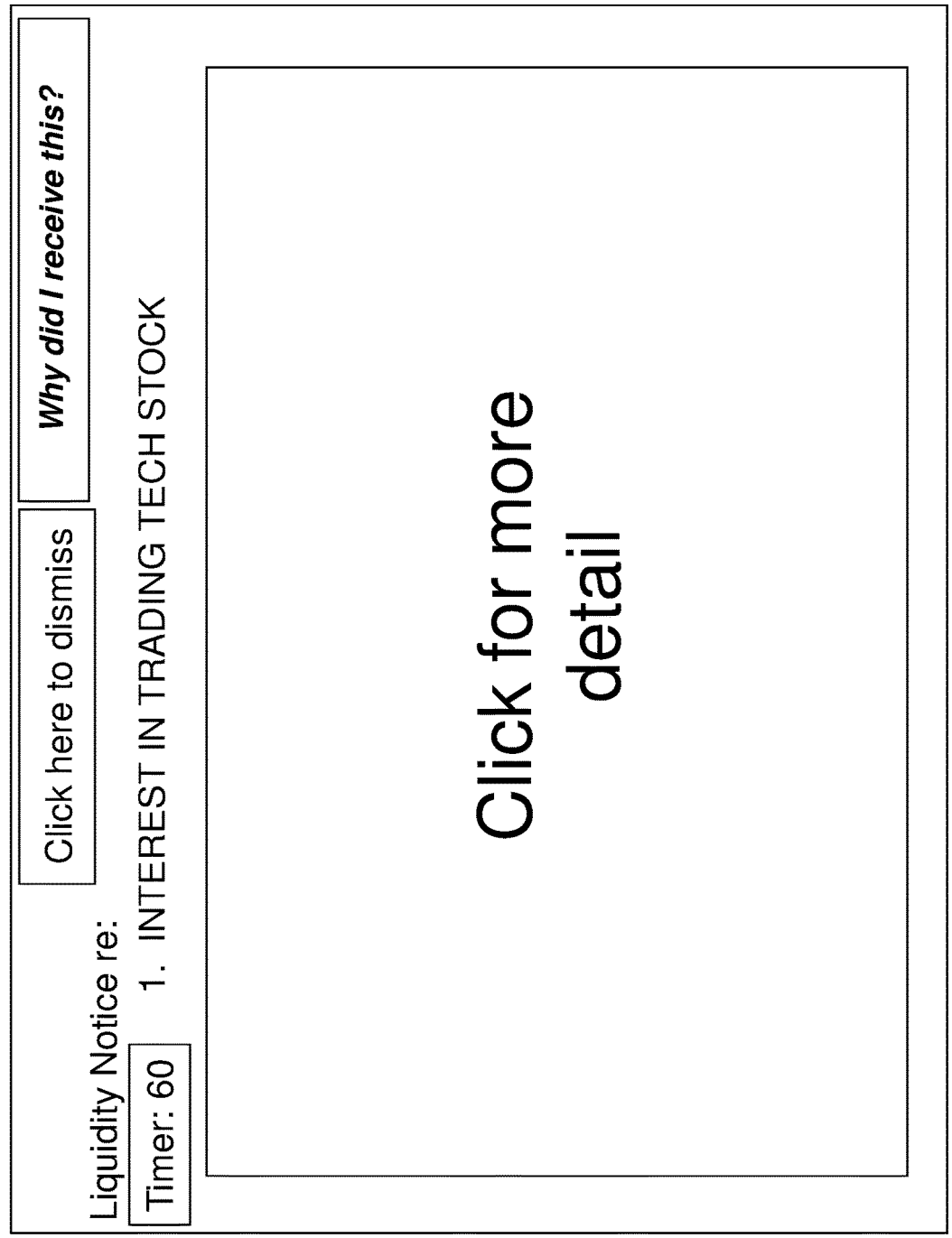

FIG. 3 depicts an exemplary liquidity notice. The liquidity notice may be displayed to a user as a result of the user being qualified to see information about liquidity associated with at least one second user, such as an order of the second user. The information provided in this initial liquidity notice may be limited. For example, as shown at the number "1," the information provided here merely informs the user that there is "interest in trading tech stock." This exemplary liquidity notice does not reveal other information such as the name of the stock or information about the side of the trade, the price, the quantity, or the counterparty.

In the top middle, FIG. 3 depicts a selectable icon entitled "click here to dismiss." Selecting this icon may cause the liquidity notice to disappear, and no further information about the liquidity may be provided. The ability to dismiss may be provided as long as the liquidity notice is shown.

Near the upper left, FIG. 3 depicts a timer. The timer may provide information about an expiration time or a time remaining to take an action. For example, the timer may indicate a time remaining to execute on the liquidity notice, or a time remaining to request additional information about the liquidity notice. The timer may continue to count down as time remains to take the action, as depicted in FIGS. 4-11.

The upper right portion of FIG. 3 shows a selectable indicia "Why did I receive this?" A user selecting this indicia may prompt the output of information about why the user is receiving the liquidity notice. For instance, if the user was qualified to receive the liquidity notice because of one or more tech stock orders stored in the user's OMS (or because of past trades of tech stocks, or other criteria), then such information may be provided to the user. In some embodiments, only limited information may be provided to the user concerning why the user received the liquidity notice, e.g., so that the user cannot deduce further information about the liquidity notice.

The center of the liquidity notice comprises a selectable indicia of "click for more detail." Selecting this indicia effectively comprises a request to (at least partially) "unwrap" the liquidity notice, i.e., to receive additional information about the liquidity, such as the information further shown in FIGS. 4-12.

Figure 4:
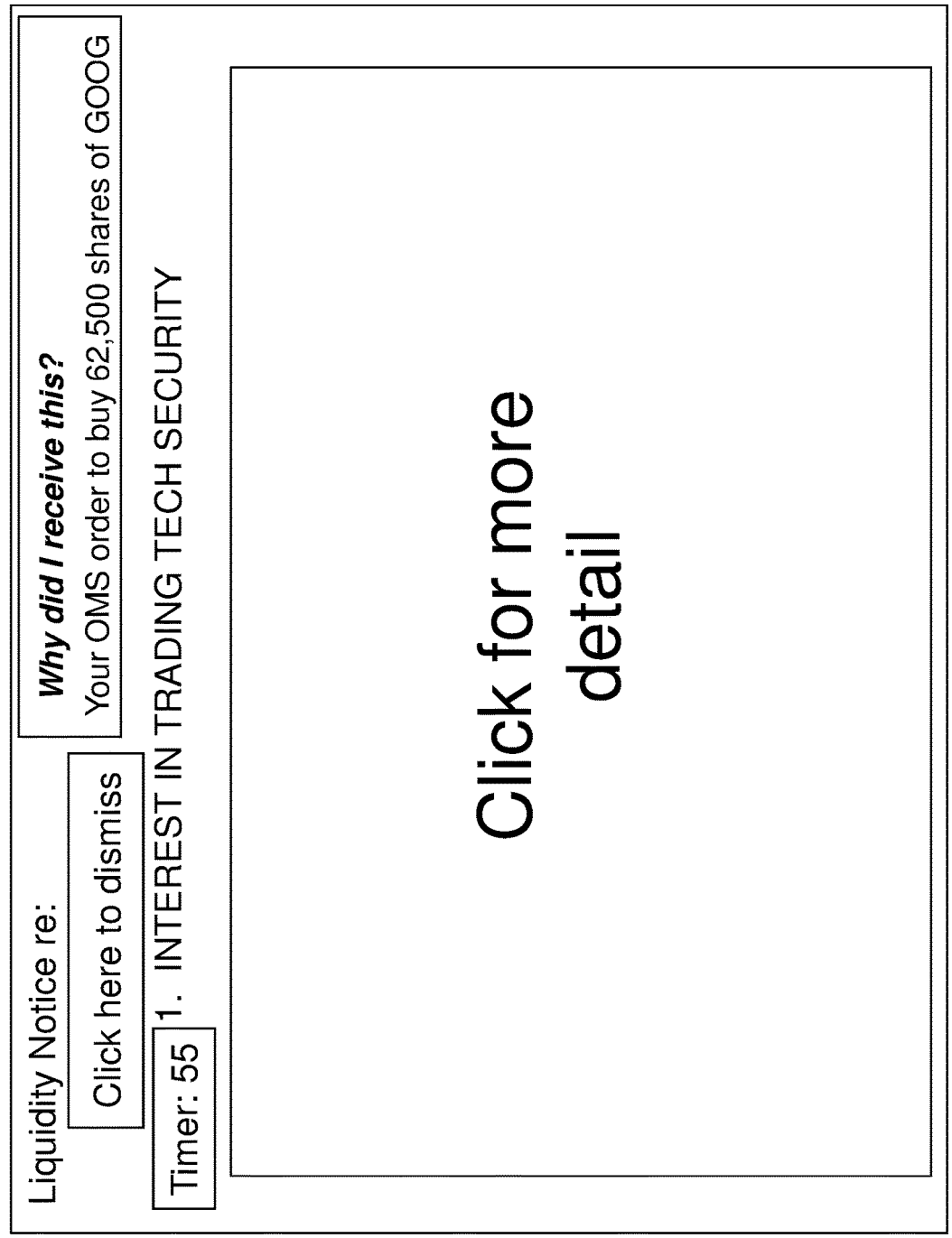

FIG. 4 depicts an exemplary user interface, e.g., after a user selected the "Why did I receive this?" icon. In the upper right, the interface explains that the reason the user received the liquidity notice is because the user's OMS contains an order to purchase 62,500 shares of Google stock (ticker: "GOOG"). As shown in the upper left, five seconds has elapsed on the timer. An additional five seconds is shown to elapse on each successive screen (FIGS. 5-12) as the timer counts down from 60 (FIG. 3) to 15 (FIG. 12).

Figure 5:
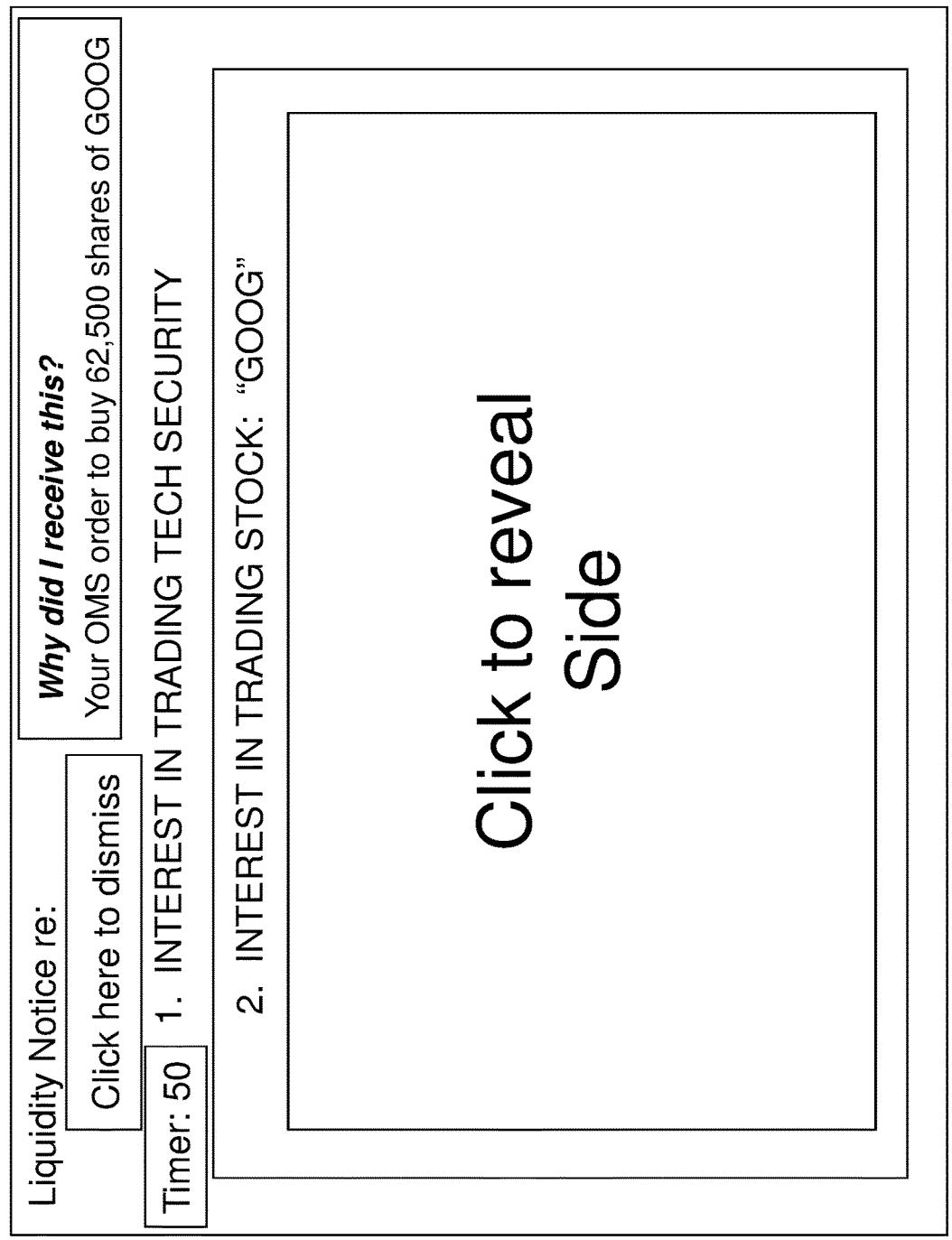

FIG. 5 depicts an exemplary interface after a user selects "click for more detail" in FIG. 4. Here, additional information (at number "3") is shown to be "interest in trading stock: 'GOOG'", indicating that the liquidity notice relates to an interest in trading Google stock. The liquidity notice does not yet indicate a buy/sell side of the underlying liquidity. A central indicia shows "Click to reveal Side," which when selected may cause the user interface to display information about the buy/sell side of the liquidity.

Figure 6:
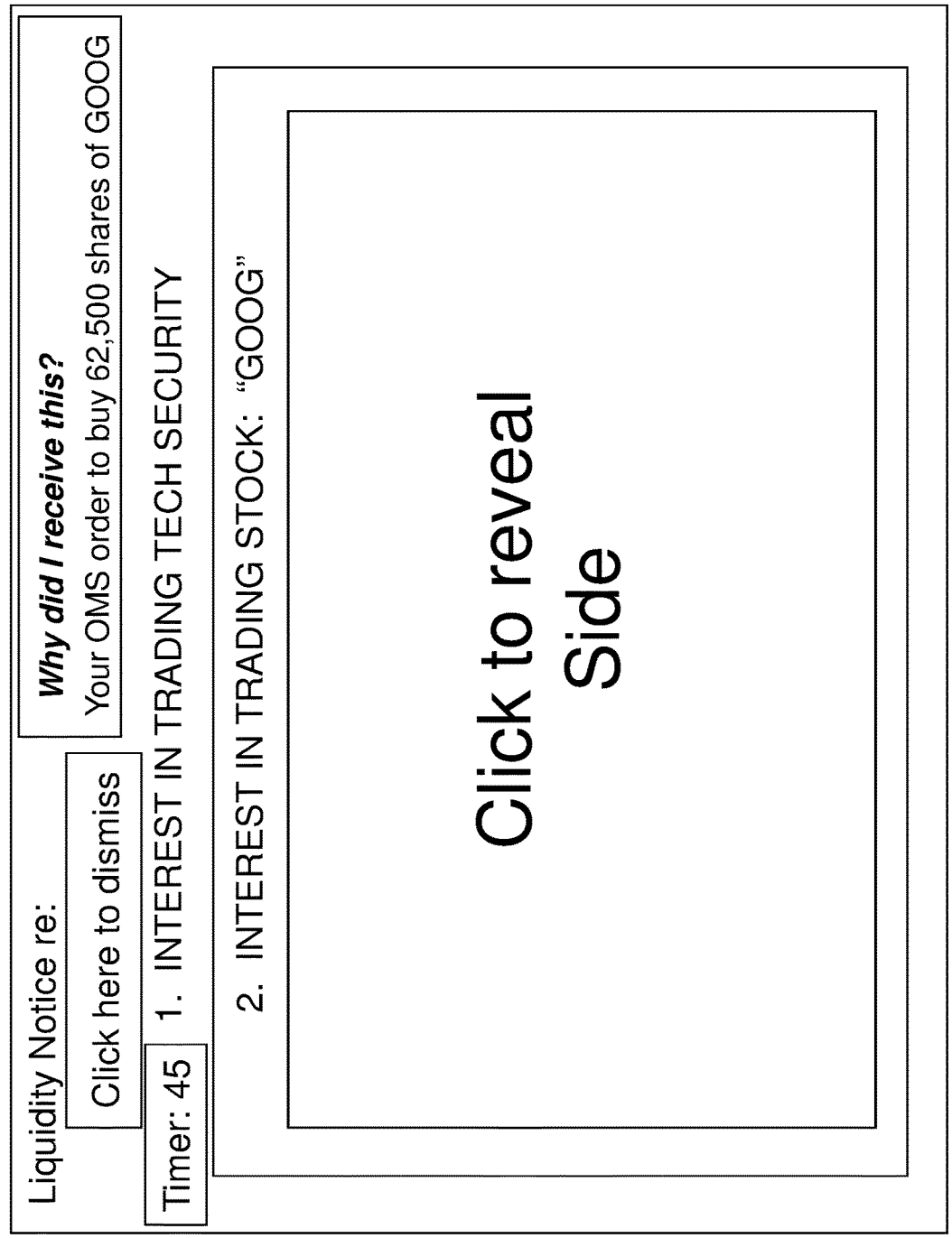

FIG. 6 depicts an exemplary interface, e.g., after five seconds has elapsed (from 50 seconds on timer to 45 seconds on timer) since the display of FIG. 5 with no further action by the user.

Figure 7:
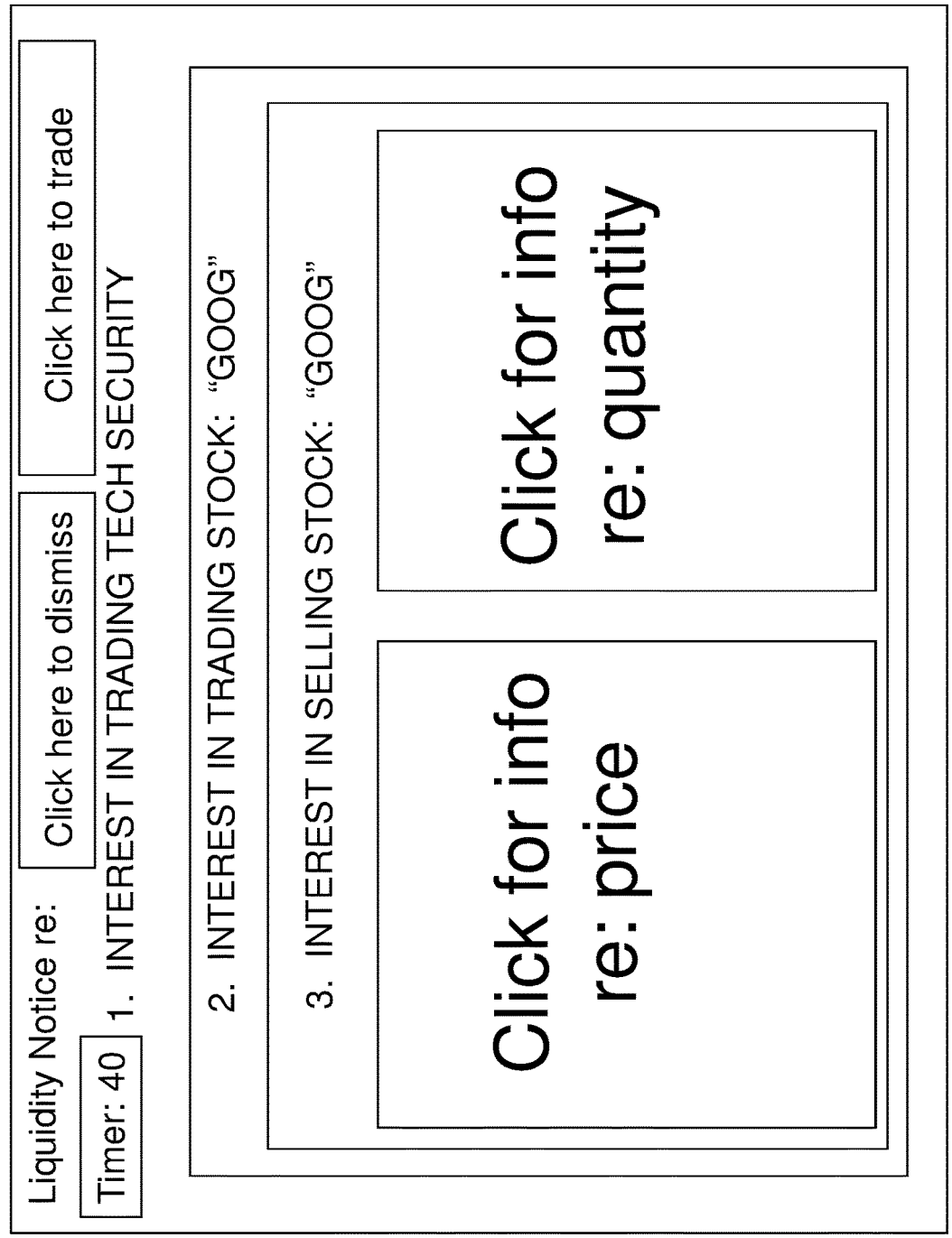

FIG. 7 depicts an exemplary interface after a user selects "click to reveal Side" in FIG. 5 or 6. Here, the user interface reveals (at number "3") the additional information that the interest is on the sell side, e.g., that the interest is "interest in selling stock: 'GOOG'". FIG. 7 prompts the user to select "Click for info re: price" and "Click for info re: quantity" in order to obtain more information about the price and/or quantity.

Figure 8:
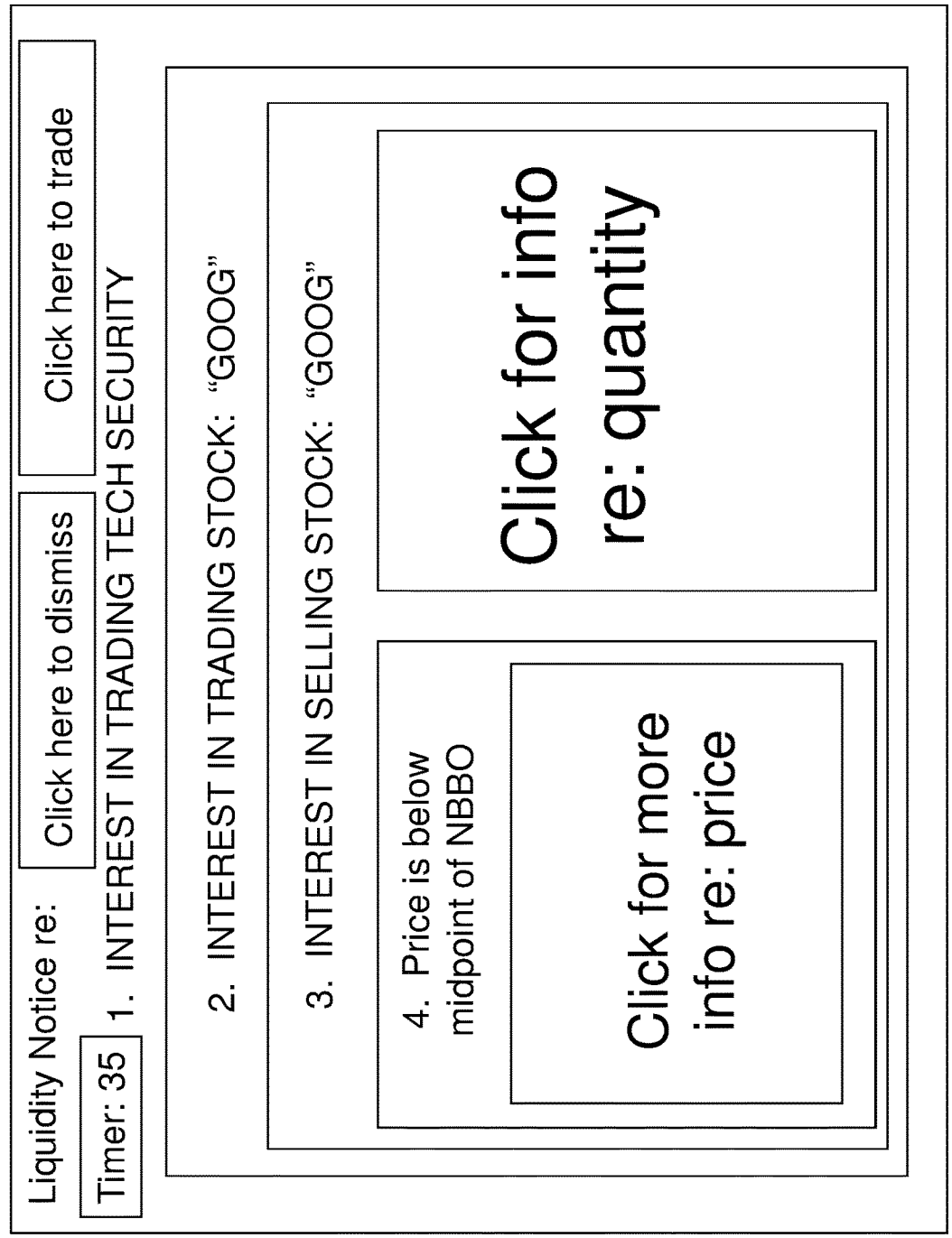

FIG. 8 depicts an exemplary interface after a user selects "Click for info re: price" in FIG. 7. Here, the user interface reveals (at number "4") that the "Price is below midpoint of NBBO", indicating that the interest is an interest to sell Google stock at a price below the midpoint of the NBBO (national best bid and best offer). The price information does not reveal a specific price, or how much below the NBBO.

Figure 9:
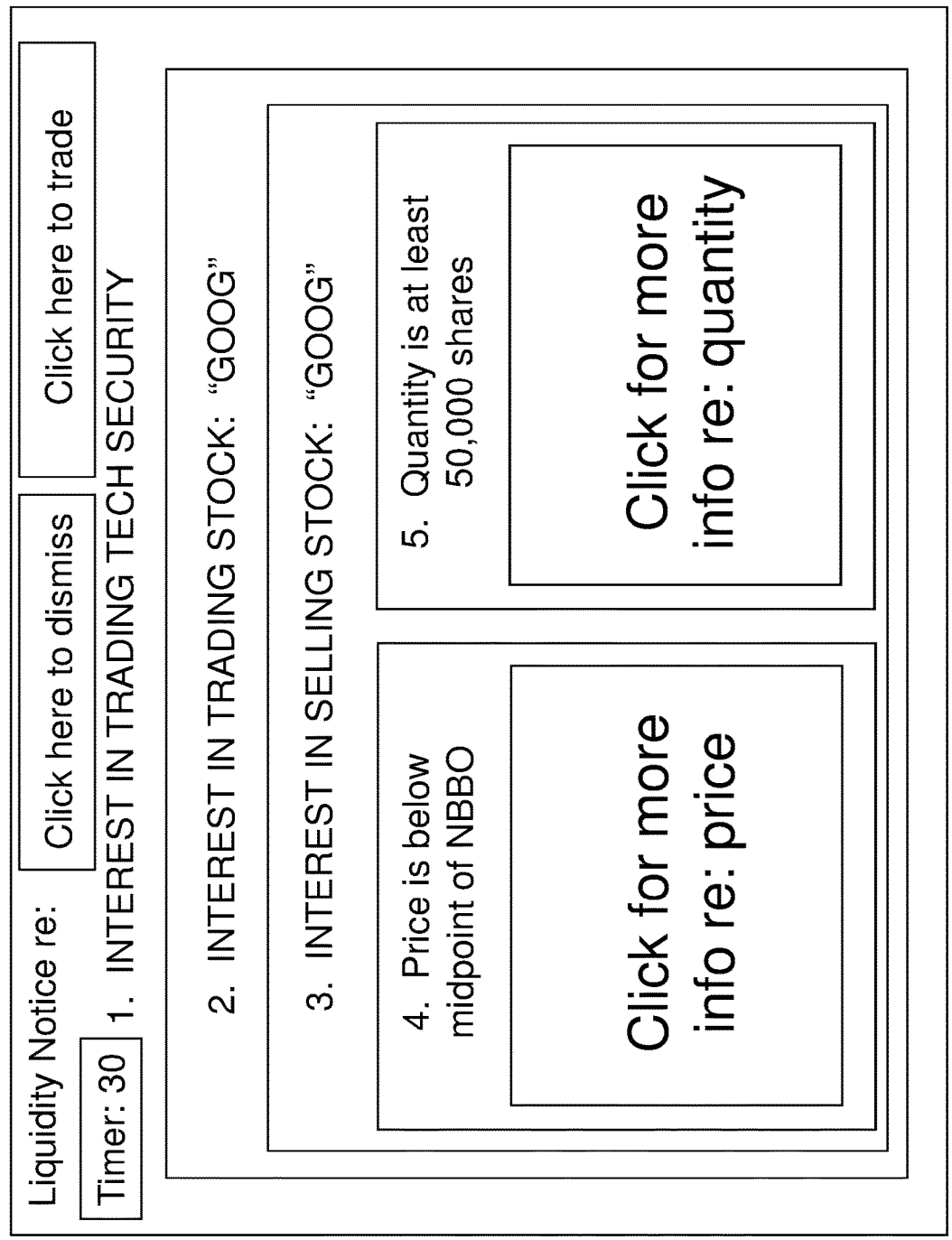

FIG. 9 depicts an exemplary interface after a user selects "Click for info re: quantity" in FIG. 8. Here, the interface reveals that the "Quantity is at least 50,000 shares." The interface does not yet reveal a specific quantity.

Figure 10:
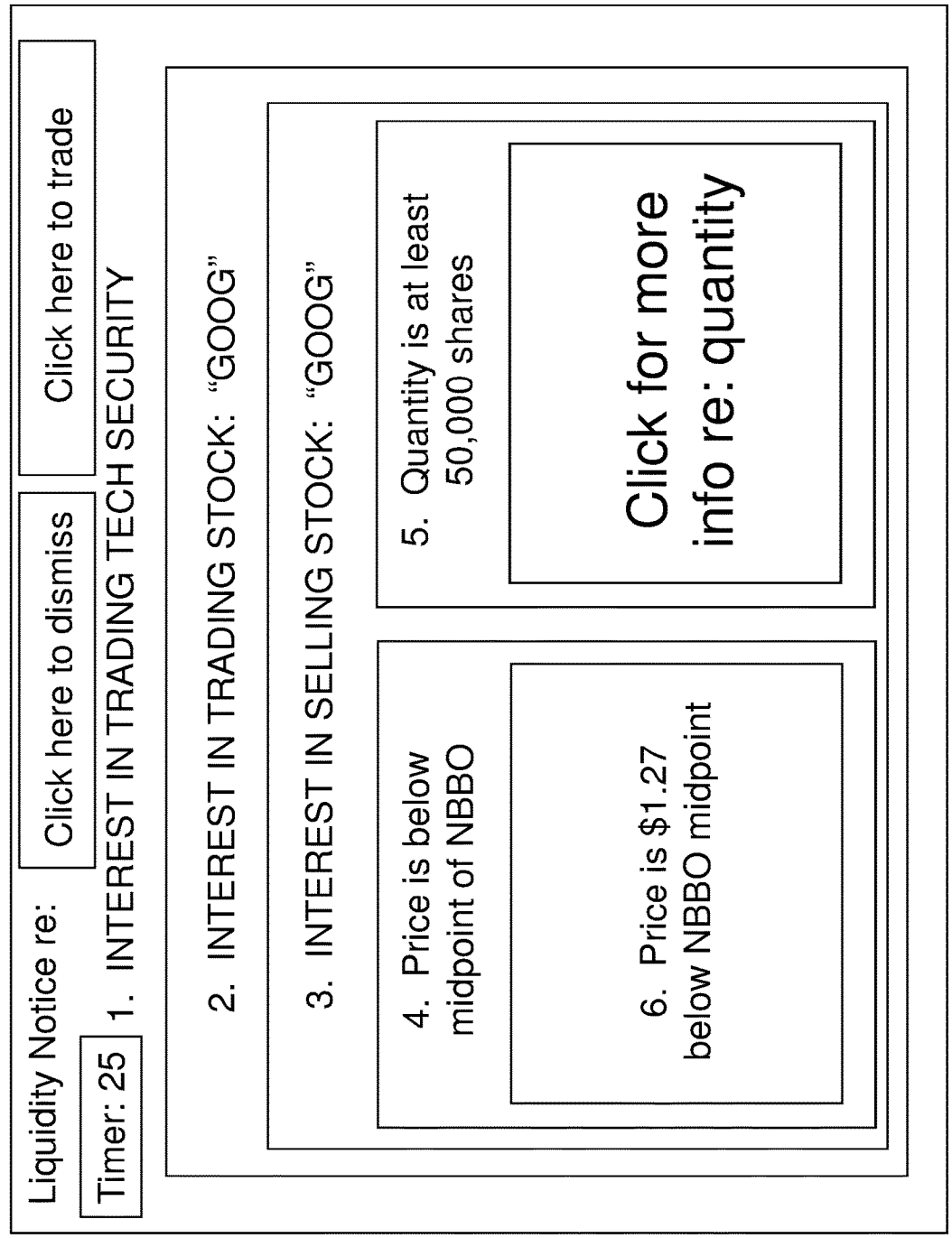

FIG. 10 depicts an exemplary interface after a user selects "Click for more info re: price" in FIG. 9. Here, the interface reveals that the "Price is $1.27 below NBBO midpoint."

Figure 11:
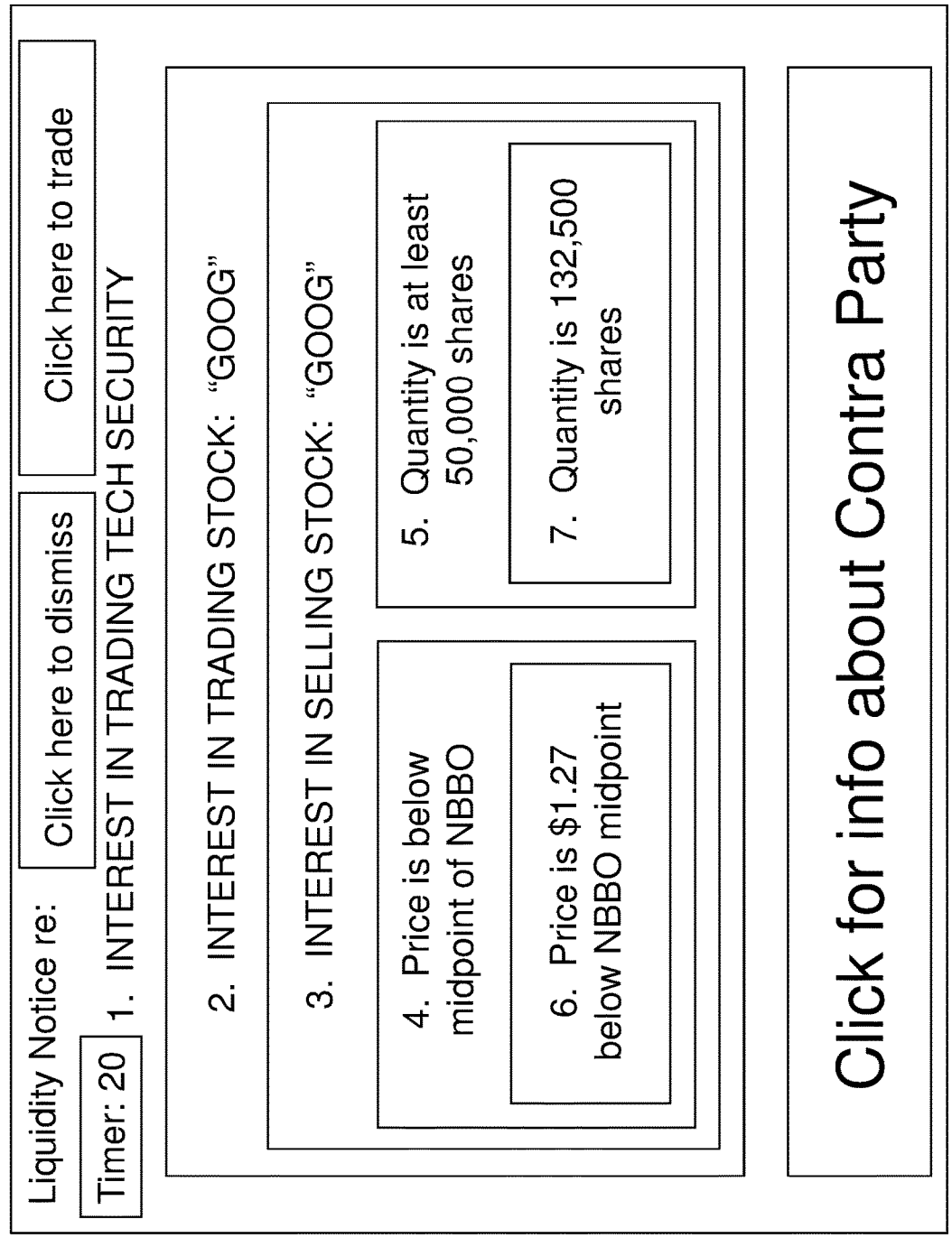

FIG. 11 depicts an exemplary interface after a user selects "Click for more info re: quantity." Here, the interface reveals that the "Quantity is 132,500 shares," providing a precise quantity.

FIG. 12 depicts an exemplary interface after a user selects "Click for info about Contra Party" at the bottom of FIG. 11. Here, the interface reveals that the contra party (i.e., the source of the order to sell Google stock) is a broker. It should be appreciated that the "Click for info about Contra Party" indicia may be provided earlier, e.g., in FIG. 3 with the original liquidity notice.

It should be appreciated that while FIGS. 3-12 show a liquidity notice with successive "unwrappings" that may be selected by the user, in some embodiments the user may not select which information may be revealed on successive screen. Also, while these Figures show a number of successive "unwrappings," in some embodiments there may be only one, two, or three unwrappings, for example.

While many features and embodiments are described with reference to Order Management Systems and orders for financial products, it should be appreciated that the features and embodiments may apply to other products and services, e.g., durable goods, oil, bandwidth (e.g., bandwidth for transmitting information via the internet, RF spectrum bandwidth, or other bandwidth), gold, commodities, and other tradeable products and services.

It should be appreciated that the features described herein may be used in connection with a dark pool matching system, e.g., via the decentralized dark pool matching system provided by AQUA.

The features described herein may be configured to operate within the trading systems described in U.S. patent application Ser. No. 12/477,549, filed Jun. 3, 2009, entitled "PRODUCTS AND PROCESSES FOR GENERATING A PLURALITY OF ORDERS," and U.S. Ser. No. 12/477,523 filed Jun. 3, 2009, such as the order management systems (e.g., the "OMS") described therein. In addition, in various additional embodiments, each of the features described herein may also be configured to operate within the trading systems described in U.S. patent application Ser. No. 10/310,345 (U.S. Patent Publication No. 2004/0034591).

It should be understood that each of the features described herein may also be configured to operate within the trading systems described in U.S. Ser. No. 12/470,431 filed May 21, 2009; U.S. patent application Ser. No. 12/135,479, filed Jun. 9, 2008, entitled "TRADING SYSTEM PRODUCTS AND PROCESSES"; U.S. patent application Ser. No. 12/113,602, filed May 1, 2008, entitled "ELECTRONIC SECURITIES MARKETPLACE HAVING INTEGRATION WITH ORDER MANAGEMENT SYSTEMS;" U.S. patent application Ser. No. 12/237,976, filed Sep. 25, 2008, entitled "TRADING RELATED TO FUND COMPOSITIONS" (now U.S. Pat. No. 8,712,903); U.S. application Ser. No. 13/234,147, filed Sep. 15, 2011; U.S. Provisional Patent Application Ser. No. 61/513,667, filed Jul. 31, 2011, entitled "SYSTEMS AND METHODS FOR PRICING ORDERS;" U.S. Provisional Patent Application Ser. No. 61/383,081, filed Sep. 15, 2010, entitled "SYSTEMS AND METHODS FOR ORDER PRICING;" U.S. Provisional Patent Application Ser. No. 61/612,958, filed Mar. 19, 2012, entitled "ORDER PRICING BASED ON MARKET IMPACT;" U.S. Provisional Patent Application Ser. No. 61/614,245, filed Mar. 22, 2012, entitled "ORDER PRICING BASED ON MARKET IMPACT;" U.S. Pat. No. 8,504,483; U.S. patent application Ser. No. 12/477,549, entitled "PRODUCTS AND PROCESSES FOR GENERATING A PLURALITY OF ORDERS;" U.S. Ser. No. 12/135,479, filed Jun. 9, 2008, entitled "TRADING SYSTEM PRODUCTS AND PROCESSES;" U.S. Ser. No. 13/888,352, filed May 6, 2013, entitled "SYSTEMS AND METHODS FOR DETECTING INTEREST AND VOLUME MATCHING;" U.S. Ser. No. 14/319,157, filed Jun. 30, 2014, entitled "LARGE BLOCK TRADING;" and U.S. Ser. No. 12/271,027, filed Nov. 14, 2008.

The disclosures of the above-identified applications, and all other patent applications and other documents referenced in this patent application, are incorporated by reference herein in their entireties.

The disclosures of the above-identified applications, and all other patent applications and other documents referenced in this patent application, are incorporated by reference herein in their entireties.

The following embodiments A1 through A26 are exemplary embodiments:

A1. A method comprising:

receiving, by at least one processor of a trading system comprising a plurality of user computer workstations in networked communication with one another, first trading information from a first user;

receiving, by the at least one processor, a first trading interest from a second user;

based at least in part on the first trading information, determining, by the at least one processor, that the first user is qualified to receive information about the first trading interest;

responsive to determining that the first user is qualified to receive information about the first trading interest, causing, by the at least one processor, first information about the first trading interest to be provided to the first user;

receiving, by the at least one processor, from the first user a first request to receive additional information about the first trading interest;

after receiving the first request, causing, by the at least one processor, second information about the first trading interest to be provided to the first user, in which the second information is different from the first information.

A2. The method of embodiment 1, further comprising:

responsive to receiving from the first user the first request to receive additional information about the first trading interest from the second user, causing, by the at least one processor, an alert to be provided to the second user indicating that information about the first trading interest has been provided to another user.

A3. The method of embodiment 1, in which the at least one processor is comprised in a first workstation of the first user, in which the first workstation is configured to receive a plurality of orders from a plurality of users behind a firewall inaccessible to the first user such that the plurality of orders remain confidential with respect to the first user and an existence of the plurality of orders is not communicated to the first user.

A4. The method of embodiment 1, in which the first trading interest comprises an order of the second user.

A5. The method of embodiment 1, in which the first trading interest comprises a firm order of the second user, the firm order being immediately executable by other users without further confirmation from the second user.

A6. The method of embodiment 1, in which the first information about the first trading interest comprises information indicating an existence of an order to trade a specified trading product.

A7. The method of embodiment 1, in which the first information about the first trading interest comprises information indicating one of (1) an order to buy a specified trading product and (2) an order to sell a specified trading product.

A8. The method of embodiment 1, in which the first information about the first trading interest comprises information about a price of an order to trade a specified trading product.

A9. The method of embodiment 8, in which the first information about the first trading interest comprises information indicating (1) an order to trade a specified trading product and (2) a specific price of the order.

A10. The method of embodiment 1, in which the first information about the first trading interest comprises information about a quantity of an order to trade a specified trading product.

A11. The method of embodiment 10, in which the first information about the first trading interest comprises information indicating (1) an order to trade a specified trading product and (2) a specific quantity of the order.

A12. The method of embodiment 1, in which the second information about the first trading interest comprises information indicating one of (1) an order to buy a specified trading product and (2) an order to sell a specified trading product.

A13. The method of embodiment 1, in which the second information about the first trading interest comprises information about a price of an order to trade a specified trading product.

A14. The method of embodiment 13, in which the second information about the first trading interest comprises information indicating (1) an order to trade a specified trading product and (2) a specific price of the order.

A15. The method of embodiment 1, in which the second information about the first trading interest comprises information about a quantity of an order to trade a specified trading product.

A16. The method of embodiment 15, in which the second information about the first trading interest comprises information indicating (1) an order to trade a specified trading product and (2) a specific quantity of the order.

A17. The method of embodiment 15, in which the first information about the first trading interest comprises information indicating an order to trade a specific trading product, and in which the act of causing first information about the first trading interest to be provided to the first user further comprises:

providing, by the at least one processor, to the first user an option to one of (1) execute against the order and (2) attempt to execute against the order.

17

A18. The method of embodiment 15, in which the act of causing second information about the first trading interest to be provided to the first user occurs responsive to receiving the first request.

A19. The method of embodiment 15, further comprising:
responsive to receiving the first request, causing information about the first request to be provided to the second user,
in which the second information about the first trading interest is selected by the second user after the act of receiving the first request and before the act of causing the second information to be provided to the first user.

A20. The method of embodiment 1, further comprising:
after causing the second information to be provided to the first user, receiving, by the at least one processor, a second request for additional information about the first trading interest; and
after receiving the second request, causing, by the at least one processor, third information about the first trading interest to be provided to the first user.

A21. The method of embodiment 1, in which the first trading information from the first user comprises a second trading interest from the first user, further comprising:
before the act of receiving from the first user the first request, causing information about the second trading interest to be provided to the second user.

A22. The method of embodiment 21,
in which the information about the second trading interest comprises information indicating an order to trade a specific trading product, and
in which the act of causing information about the second trading interest to be provided to the second user further comprises:
providing to the second user an option to one of (1) execute against the order and (2) attempt to execute against the order.

A23. The method of embodiment 1,
in which the first information about the first trading interest comprises information indicating an order to trade a specific trading product, and
in which the act of determining that the first user is qualified to receive information about the first trading interest comprises determining that the a matching contra order is stored in an OMS of the first user.

A24. The method of embodiment 1, wherein the first information about the first trading interest comprises a ticker symbol identifying a trading product.

A25. The method of embodiment 1,
in which the first trading interest comprises an order from the second user to trade a specific trading product, and
in which a preference to disclose only partial information about the order to qualified users is received from the second user before the first information about the first trading interest is caused to be provided to the first user.

A26. The method of embodiment 1,
in which the first trading interest comprises an order from the second user to trade a specific trading product, and
in which a preference to disclose only the first information to users qualified to receive information about the order is received from the second user before the first information about the first trading interest is caused to be provided to the first user.

A27. The method of embodiment 1, further comprising:
storing a timestamp indicating a time at which the first information was caused to be provided to the first user; and
providing the timestamp to the second user.

A28. The method of embodiment 27, in which the timestamp is provided to the second user on a delayed basis.

18

A29. An apparatus comprising:
at least one processor; and
at least one memory having instructions stored thereon which, when executed by the at least one processor, direct the at least one processor to perform the method of any of embodiments A1-A28.

A30. A computer-readable medium having instructions stored thereon which, when executed by the at least one processor, direct the at least one processor to perform the method of any of embodiments A1-A28.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method comprising:
receiving, by at least one processor of a trading system comprising a plurality of user computer workstations in networked communication with one another, first trading information from a first user;
receiving, by the at least one processor, a first trading interest from a second user;
based at least in part on the first trading information, determining, by the at least one processor, that the first user is qualified to receive information about the first trading interest;
responsive to determining that the first user is qualified to receive information about the first trading interest, causing, by the at least one processor, first information about the first trading interest to be provided to the first user;
receiving, by the at least one processor, from the first user a first request to receive additional information about the first trading interest;
after receiving the first request, causing, by the at least one processor, second information about the first trading interest to be provided to the first user, in which the second information is different from the first information; responsive to receiving from the first user the first request to receive additional information about the first trading interest from the second user, causing, by the at least one processor, to generate a window of a graphical user interface wherein the window includes an alert to be provided to the second user indicating that information about the first trading interest has been provided to another user;
in which the at least one processor is comprised in a first workstation of the first user,
in which the first workstation is configured to receive a plurality of orders from a plurality of users behind a firewall inaccessible to the first user such that the plurality of orders remain confidential with respect to the first user and an existence of the plurality of orders is not communicated to the first user, and
in which the first trading interest comprises an order of the second user; and
configuring, by the at least one processor, the plurality of workstations to be implemented in a decentralized configuration to enable each of the workstations to perform matching functions to trigger liquidity notices, and to enable each of the workstations to analyze trading information from an Order Management System (OMS) and information about orders from other users without revealing information about the other orders, wherein the firewall of each of the workstations to prevent information about orders from being disclosed, wherein when a workstation identifies a possible match based on the trading information from the OMS and trade information received from one of the other users, the workstation to cause a liquidity notice to be output.

2. The method of claim 1, further comprising:
in which the first information about the first trading interest comprises information indicating one of (1) an order to buy a specified trading product and (2) an order to sell a specified trading product.

3. The method of claim 1,
in which the first trading interest comprises a firm order of the second user, the firm order being immediately executable by other users without further confirmation from the second user, and
in which the first information about the first trading interest comprises information indicating to the first user an existence of an order to trade a specified trading product.

4. The method of claim 1, in which the first information about the first trading interest comprises information about a price of an order to trade a specified trading product, in which the first information indicates the identity of the specified trading product.

5. The method of claim 4, in which the first information about the first trading interest comprises information indicating (1) a buy/sell side of the order to trade a specified trading product and (2) a specific price of the order.

6. The method of claim 1, in which the first information about the first trading interest comprises information indicating an order to trade a specific quantity of a specified trading product.

7. The method of claim 1, in which the second information about the first trading interest comprises information indicating an existence of one of (1) an order to buy a specified trading product and (2) an order to sell a specified trading product, in which such existence of such order was not previously disclosed to the first user.

8. The method of claim 1, in which the second information about the first trading interest comprises information about a price of an order to trade a specified trading product, in which the price of the order was not previously disclosed to the first user.

9. The method of claim 1, in which the second information about the first trading interest comprises information about a quantity of an order to trade a specified trading product, in which the second information indicates the identity of the specified trading product.

10. The method of claim 9, in which the second information about the first trading interest comprises information indicating an existence of (1) an order to trade a specified trading product and (2) a specific quantity of the order, in which such order and specific quantity were not previously disclosed to the first user.

11. The method of claim 9,
in which the act of causing second information about the first trading interest to be provided to the first user occurs responsive to receiving the first request,
in which the first information about the first trading interest comprises information indicating an order to trade a specific trading product, and
in which the act of causing first information about the first trading interest to be provided to the first user further comprises:
providing, by the at least one processor, to the first user an option to one of (1) execute against the order and (2) attempt to execute against the order.

12. The method of claim 9, further comprising:
responsive to receiving the first request, causing information about the first request to be provided to the second user,
in which the second information about the first trading interest is selected by the second user after the act of receiving the first request and before the act of causing the second information to be provided to the first user.

13. The method of claim 1, further comprising:
after causing the second information to be provided to the first user, receiving, by the at least one processor, a second request for additional information about the first trading interest; and
after receiving the second request, causing, by the at least one processor, third information about the first trading interest to be provided to the first user.

14. The method of claim 1, in which the first trading information from the first user comprises a second trading interest from the first user, further comprising:
before the act of receiving from the first user the first request, causing information about the second trading interest to be provided to the second user.

15. The method of claim 14,
in which the information about the second trading interest comprises information indicating an order to trade a specific trading product, and
in which the act of causing information about the second trading interest to be provided to the second user further comprises:
providing to the second user an option to one of (1) execute against the order and (2) attempt to execute against the order.

16. The method of claim 1,
in which the first information about the first trading interest comprises information indicating an order to trade a specific trading product, and
in which the act of determining that the first user is qualified to receive information about the first trading interest comprises determining that a matching contra order is stored in an OMS of the first user.

17. The method of claim 1,
in which the first trading interest comprises an order from the second user to trade a specific trading product, and
in which a preference to disclose only partial information about the order to qualified users is received from the second user before the first information about the first trading interest is caused to be provided to the first user.

18. The method of claim 1,
in which the first trading interest comprises an order from the second user to trade a specific trading product, and
in which a preference to disclose only the first information to users qualified to receive information about the order is received from the second user before the first information about the first trading interest is caused to be provided to the first user.

19. The method of claim 1, further comprising:
storing a timestamp indicating a time at which the first information was caused to be provided to the first user; and
providing the timestamp to the second user.

20. The method of claim 19, in which the timestamp is provided to the second user on a delayed basis after the timestamp is stored.

21. An apparatus comprising:

at least one processor; and at least one memory having instructions stored thereon which, when executed by the at least one processor, direct the at least one processor to:

receive first trading information from a first user;

receive a first trading interest from a second user;

based at least in part on the first trading information, determine that the first user is qualified to receive information about the first trading interest;

responsive to determining that the first user is qualified to receive information about the first trading interest, cause first information about the first trading interest to be provided to the first user;

receive from the first user a first request to receive additional information about the first trading interest;

after receiving the first request, cause second information about the first trading interest to be provided to the first user, in which the second information is different from the first information;

responsive to receiving from the first user the first request to receive additional information about the first trading interest from the second user, generate a window of a graphical user interface wherein the window includes an alert to be provided to the second user indicating that information about the first trading interest has been provided to another user;

in which the at least one processor is comprised in a first workstation of the first user, in which the first workstation is configured to receive a plurality of orders from a plurality of users behind a firewall inaccessible to the first user such that the plurality of orders remain confidential with respect to the first user and an existence of the plurality of orders is not communicated to the first user, and in which the first trading interest comprises an order of the second user; and configure the plurality of workstations to be implemented in a decentralized configuration to enable each of the workstations to perform matching functions to trigger liquidity notices, and to enable each of the workstations to analyze trading information from an Order Management System (OMS) and information about orders from other users without revealing information about the other orders, wherein the firewall of each of the workstations to prevent information about orders from being disclosed, wherein when a workstation identifies a possible match based on the trading information from the OMS and trade information received from one of the other users, the workstation to cause a liquidity notice to be output.

22. A computer-readable medium having instructions stored thereon which, when executed by the at least one processor, direct the at least one processor to:

receive first trading information from a first user;

receive a first trading interest from a second user;

based at least in part on the first trading information, determine that the first user is qualified to receive information about the first trading interest;

responsive to determining that the first user is qualified to receive information about the first trading interest, cause first information about the first trading interest to be provided to the first user;

receive from the first user a first request to receive additional information about the first trading interest;

after receiving the first request, cause second information about the first trading interest to be provided to the first user, in which the second information is different from the first information;

responsive to receiving from the first user the first request to receive additional information about the first trading interest from the second user, generate a window of a graphical user interface wherein the window includes an alert to be provided to the second user indicating that information about the first trading interest has been provided to another user;

in which the at least one processor is comprised in a first workstation of the first user, in which the first workstation is configured to receive a plurality of orders from a plurality of users behind a firewall inaccessible to the first user such that the plurality of orders remain confidential with respect to the first user and an existence of the plurality of orders is not communicated to the first user, and in which the first trading interest comprises an order of the second user; and configure the plurality of workstations to be implemented in a decentralized configuration to enable each of the workstations to perform matching functions to trigger liquidity notices, and to enable each of the workstations to analyze trading information from an Order Management System (OMS) and information about orders from other users without revealing information about the other orders, wherein the firewall of each of the workstations to prevent information about orders from being disclosed, wherein when a workstation identifies a possible match based on the trading information from the OMS and trade information received from one of the other users, the workstation to cause a liquidity notice to be output.

\* \* \* \* \*